United States Patent
Hughes et al.

(10) Patent No.: US 11,255,659 B2
(45) Date of Patent: Feb. 22, 2022

(54) THICKNESS DETERMINATION OF WEB PRODUCT BY MID-INFRARED WAVELENGTH SCANNING INTERFEROMETRY

(71) Applicant: Honeywell Limited, Mississauga (CA)

(72) Inventors: Michael Kon Yew Hughes, Vancouver (CA); Sebastien Tixier, North Vancouver (CA); Stephane Savard, Vancouver (CA)

(73) Assignee: Honeywell ASCa, Mississauga (CA)

( * ) Notice: Subject to any disclaimer, the term of this patent is extended or adjusted under 35 U.S.C. 154(b) by 788 days.

(21) Appl. No.: 15/900,192

(22) Filed: Feb. 20, 2018

(65) Prior Publication Data

US 2018/0172432 A1 Jun. 21, 2018

Related U.S. Application Data

(62) Division of application No. 14/197,181, filed on Mar. 4, 2014, now abandoned.

(51) Int. Cl.
*G01B 11/06* (2006.01)
*G01B 9/02* (2006.01)
*G01B 9/02017* (2022.01)

(52) U.S. Cl.
CPC ...... *G01B 11/0675* (2013.01); *G01B 9/02017* (2013.01); *G01B 11/0691* (2013.01); *G01B 11/0625* (2013.01); *G01B 2210/46* (2013.01)

(58) Field of Classification Search
CPC ............ G01B 11/0675; G01B 11/0691; G01B 11/0625; G01B 9/02017; G01B 2210/46
See application file for complete search history.

(56) References Cited

U.S. PATENT DOCUMENTS

| 5,034,617 A | * | 7/1991 | Isobe | ................ G01B 11/0616 250/559.28 |
| 7,046,373 B2 | * | 5/2006 | Coppola | ............ G01B 11/0675 356/517 |

(Continued)

FOREIGN PATENT DOCUMENTS

JP   H07280523 A   10/1995

OTHER PUBLICATIONS

1st Office Action dated Sep. 11, 2019 for corresponding CN Application No. 201580011808.2.

*Primary Examiner* — David P Porta
*Assistant Examiner* — Carolyn Fin
(74) *Attorney, Agent, or Firm* — Charles H. Jew

(57) ABSTRACT

Non-contacting caliper measurements of free-standing sheets detect mid-IR interferometric fringes created by the reflection of light from the top and bottom surfaces of the sheet. The technique includes directing a laser beam at a selected angle of incidence onto a single spot on the exposed outer surface and scanning the laser beam through a selected wavelength range as the laser beam is directed onto the exposed outer surface and measuring the intensity of an interference pattern that forms from the superposition of radiation that is reflected from the exposed outer surface and from the inner surface. Alternatively, the intensity of an interference pattern formed from the superposition of radiation that is directly transmitted through the web and radiation that is transmitted through the web after internal reflections from the internal surfaces of the web. Thickness can be extracted from the fringe separation in the interference pattern.

16 Claims, 3 Drawing Sheets

(56) References Cited

U.S. PATENT DOCUMENTS

| 2012/0113426 A1* | 5/2012 | Rao | G01N 21/39 |
| | | | 356/437 |
| 2013/0292571 A1 | 11/2013 | Mukherjee et al. | |
| 2015/0204655 A1* | 7/2015 | Wang | G01B 11/0675 |
| | | | 356/503 |

* cited by examiner

THICKNESS DETERMINATION OF WEB PRODUCT BY MID-INFRARED WAVELENGTH SCANNING INTERFEROMETRY

REFERENCE TO RELATED APPLICATION

This application is a divisional patent application of U.S. patent application Ser. No. 14/197,181 which was filed on Mar. 4, 2014 and which is incorporated herein by reference.

The present invention relates generally to interferometry techniques for non-contacting thickness or caliper measurements of a moving sheet such as porous polymer and paper and more particularly to methods of detecting mid-IR interferometric fringes created by the reflection of light from the top and bottom surfaces of the sheet and thereafter extracting the thickness from the fringe separation.

BACKGROUND OF THE INVENTION

Caliper is one of the most important quality specifications of paper and plastic products. Traditional commercial on-line caliper measurement requires the measuring heads to physically touch the web. Contacting the web causes a number of issues with the two most significant ones being the marking of the sheet and the accumulating of dirt on the measuring heads, which leads to measurement drift and inaccuracy. More advanced techniques make use of laser triangulation or confocal microscopy techniques but they still require a measuring head to contact one side of the web. Moreover, prior art optical techniques are not suitable to all paper products because they are very sensitive to the scattering properties of the sheet. In addition, achieving better than 1 micron accuracy is a challenge as these techniques rely on the difference between two independent distance measurements. As such, both measurements must be stable with respect to each other in order to attain the required profile accuracy. This is difficult to achieve in the paper scanner environment where the measurement heads are exposed to frequent temperature changes and the positions of the paper and heads are subject to constant fluctuations. The art is desirous of developing reliable on-line techniques for accurately measuring the thickness web materials during production.

SUMMARY OF THE INVENTION

The present invention is based in part on the demonstration that mid-IR interferometry is particularly effective in measuring web thickness. In one aspect, the invention is directed to a method of measuring the thickness of a web, which has a first side and a second side, that includes the steps of:

supporting the web so that the web has a free standing portion where the web has an exposed outer surface on the first side and an inner surface on the second side;

directing a laser beam at a selected angle of incidence onto a single spot on the exposed outer surface on the first side, wherein the laser beam comprises substantially monochromatic radiation having a wavelength in the 3-50 micron range;

scanning the laser beam through a selected wavelength range as the laser beam is directed onto the spot on the exposed outer surface;

measuring the intensity of an interference pattern that forms from superposition of radiation that emerges upon exposure to the web; and extracting the thickness of the web by utilizing the relationship among the laser beam incident angle, wavelength, index of refraction of the web, and web thickness.

A preferred technique of obtaining the thickness is by fitting the interference pattern to the formula given by the interference relationship, $$n_1^2 \sin^2 \theta_1 = n_2^2 - \left(\frac{m\lambda_0}{2d}\right)^2, \text{ wherein } m \text{ is an integer, } m = 0, 1, 2, \ldots \quad (1)$$

relating incident angle ($\theta_1$), wavelength ($\lambda_0$), index of refraction of the air ($n_1$), index of refraction of the web ($n_2$) and web thickness (d), wherein angle, wavelength and indices are known, and web thickness is taken as a variable parameter, such as by finding the least-square error by adjusting a variable, which is the thickness.

In another aspect, the invention is directed to a non-contacting caliper sensor for measuring the thickness of a web of scattering material having a first side and a second side, including:

a substantially monochromatic laser that provides a beam of incident radiation that has a wavelength in the 3-50 micron range;

means for directing the incident radiation toward a single spot on an exposed outer surface on the first side of the sheet wherein the incident radiation reaches a fixed position on the exposed surface at an angle of incidence of from 0 to 60 degrees with respect to the web surface normal;

means for detecting the interference pattern which forms by superposition of a first radiation reflected from the exposed outer surface and a second radiation reflected from an inner surface of the second side; and means for analyzing an interference pattern to calculate the thickness of the web.

In a preferred embodiment, radiation in the mid-infrared wavelength (3-50 microns), which is preferably in the 8-25 micron range, is directed into the paper web and interferometric fringes created by the reflection of the light at the top and bottom surfaces of the web are recorded. In comparison with radiation of shorter wavelengths, mid-IR wavelengths are less affected by scattering in the paper which makes the inventive technique suitable to applications unsuitable to prior art techniques. Web thickness in the range of 20 microns to 2-3 mm can be measured if the caliper sensor wavelength is extended to the far-IR (typically having a wavelength of 50 microns to 1 mm) or terahertz range (typically having a wavelength of 100 microns to 1 mm). The web does not come into contact with the measurement head in which the caliper sensor is positioned. The measurement can be performed in a reflection geometry requiring only one measurement head.

DETAILED DESCRIPTION OF THE PREFERRED EMBODIMENTS

The present invention relates to non-contact sensor devices for measuring the thickness of a film, web or sheet. While the sensor will be illustrated in calculating the caliper of paper, it is understood that the sensor can measure thickness of a variety of flat materials including, for example, coated materials, plastics, fabrics, and the like. The sensor is particularly suited for thickness detection of porous polymers (plastic) made of polyethylene, polypropylene, polyethylene terephthalate, polytetrafluoroethylene or polyvinyl chloride.

Figure 1:
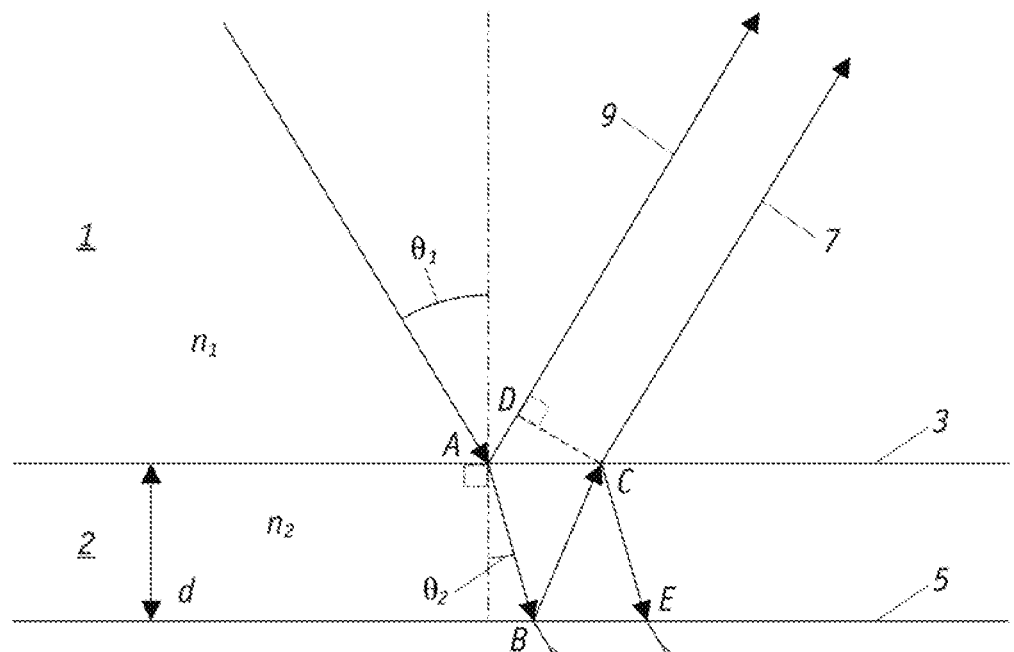
FIG. 1 illustrates a beam directed at a web and the scatter of the beam by the top and lower surfaces of the web.

FIG. 1 illustrates the electromagnetic radiation beam geometry incident, reflected and refracted on a web product 2 of thickness d and having (i) a first or upper surface 3 from which the incident electromagnetic radiation enters web product 2 and (ii) a second or inner surface 5 from which the transmitted electromagnetic radiation is partially reflected internally and partially transmitted and exits web product 2. As shown, the incident electromagnetic radiation of vacuum wavelength $\lambda_0$ is reflected (7,9). In addition, the portion of the incident electromagnetic radiation propagating into the web is refracted since the index of refraction outside the web is different from that inside the web. The distance between the first surface 3 and the second surface 5 is the thickness of the web d, to be measured. The index of refraction of the air around the web is $n_1$ and the index of refraction within the web is $n_2$. The optical path length difference between beam 7 and beam 9 is $\Delta=2n_2d\cos\theta_2$. The corresponding phase difference is $\delta=k_0\Delta-\pi$, where $k_0=2\pi/\lambda_0$. In terms of incident angle $\theta_1$, the phase difference is:

$$\delta = \frac{4\pi d}{\lambda_0}\sqrt{(n_2^2 - n_1^2 \sin^2\theta_1)} - \pi \quad (2)$$

Interference minima occurs at $\delta=(2m+1)\pi$, where m=0, 1, 2, . . . .

For instance, assuming that the incident angle is 30°, the web thickness is 80 µm, the air index of refraction is 1, and the web index of refraction is 1.5, to produce a change of one order in interference minima from m=22 to m=21 requires an increase in $\lambda_0$ of 0.622 µm. The refractive index of the web being measured is preferably independently determined prior to calculating the thickness.

FIG. 1 also shows the directly transmitted beam 11, and the beam transmitted 13, after internal reflections from the internal surfaces of planes 3 and 5. The interference minima condition for the reflected beams 7 and 9 corresponds to the interference maxima condition for the transmitted beams 11 and 13.

In operation, once the interference pattern is obtained, standard techniques can be implemented to ascertain the web thickness. A preferred technique comprises least-squares fitting the interference pattern intensity distribution with wavelength to a mathematical relationship by using web thickness as a fitting parameter. One method of extracting the material thickness from the spectra is to fit the interference order spectra using the interference relationship given in equation 1 above. The thickness d can be extracted from the fit. Another method is to record the wavelengths of the zero crossings or interference minima for the reflection mode which occur when equation 2 is satisfied. In the transmission mode, the interference maxima are measured and their formation is governed by the same relationship given by equation 2. By plotting the values of the wave number $1/\lambda_0$ at the zero crossing as a function of m, a line of slope $2d\sqrt{n_2^2-n_1^2\sin^2\theta_1}$ is obtained. Assuming that $n_1$, typically air ($n_1=1$), is known and the index of refraction of the material $n_2$ is obtained independently, the thickness d is then calculated from the relationship between the slope and d.

The caliper sensor of the present invention preferably uses a quantum cascade laser (QCL) operating at variable wavelengths in the 8-25 micron range. A suitable QCL is commercially available from Daylight Solutions, Inc. (San Diego, Calif.). The laser beam is preferably directed at the web being monitored at an angle in the range of 0 to 60 degrees and the specular intensity is measured as the laser radiation wavelength is varied over a range sufficient to produce at least 2 interference minima in the interference pattern.

Figure 2:
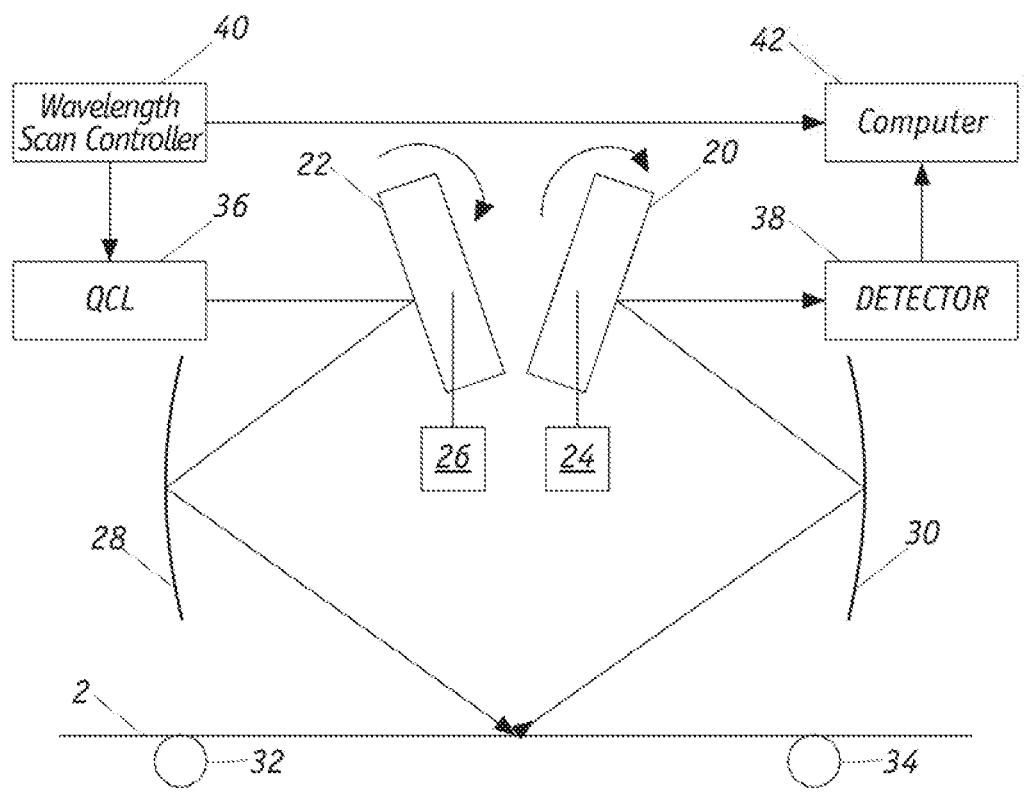
FIGS. 2 and 3 show embodiments of the caliper sensor.

FIG. 2 shows a caliper sensor operating in the reflective mode that includes a stationary QCL 36, a pair of turning mirrors 20, 22 a pair of relay mirrors 28, 30 and stationary detector 38 that are positioned on the same side of moving web 2 which is supported by rollers 32, 34. Turning mirrors 20 and 22 are mounted to rotational mechanisms 24 and 26, respectively. In operation, QCL 36 generates a laser beam that is directed toward turning mirror 22, which is shown to be in a first position, so that reflected beam is steered by relay mirror 28 onto a stationary position on moving web 2. Reflected radiation from web 2 is directed into detector 38 by relay mirror 30 and turning mirror 20. Detector 38 can comprise a photodiode that measures the intensity of the radiation captured. Each of the relay mirrors is preferably a stationary, single conventional concave spherical mirror. Once the beam is set to a specified angle of incidence, the laser light source is scanned sequentially through a series of wavelengths while the detector measures the intensity of the interference pattern. A wavelength scan controller 40 generates suitable synchronized wavelength signals to both QCL 36 and computer 42 to coordinate measurement. The computer correlates measurement signals from detector 38 with the wavelength of the laser beam in the scanning process. The measurement signals at each wavelength are normalized to an independently determined wavelength dependent output of the QCL. Turning mirrors 20 and 22 remain stationary during the scanning process. The scanning process continues until the entire range is covered. Suitable detectors include, for example, an HdCdTe (mercury cadmium telluride) solid state detector.

The wavelength range that the QCL light source can cover can be extended by using multiple QCL devices, each tunable over its own narrow wavelength range and multiplexed together through a system of mirrors and dichroic beam splitters, to create a laser source that can be scanned through a broad wavelength range.

Figure 3:
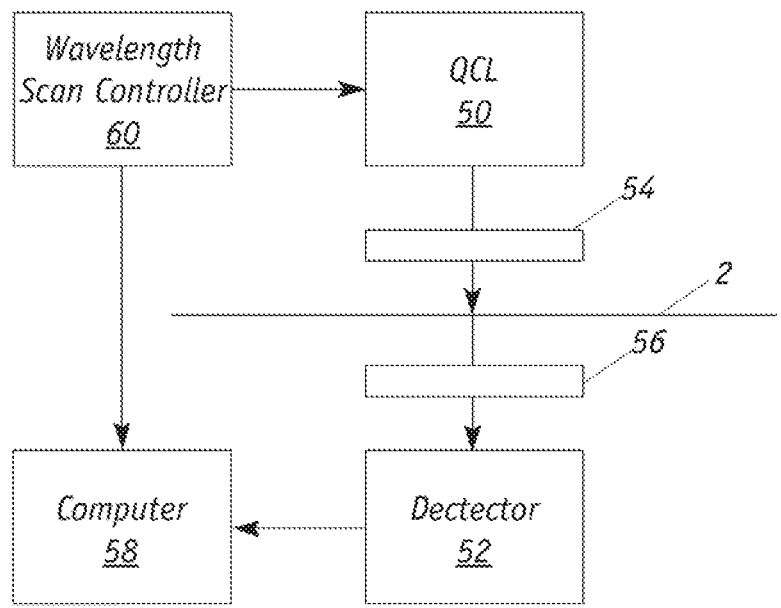

FIG. 3 illustrates a caliper sensor operating in the transmissive mode that includes QCL 50 and associated collimation optics 54 that are positioned on one side of moving web 2 and detector 52 and associated collection optics 56 that are positioned on the other side of web 2. The detector can comprise a single point detector. A wavelength scan controller 60 generates suitable synchronized wavelength signals to both QCL 50 and computer 58 to coordinate measurement. The computer correlates measurement signals from detector 52 with the wavelength of the laser beam in the scanning process.

Figure 4:
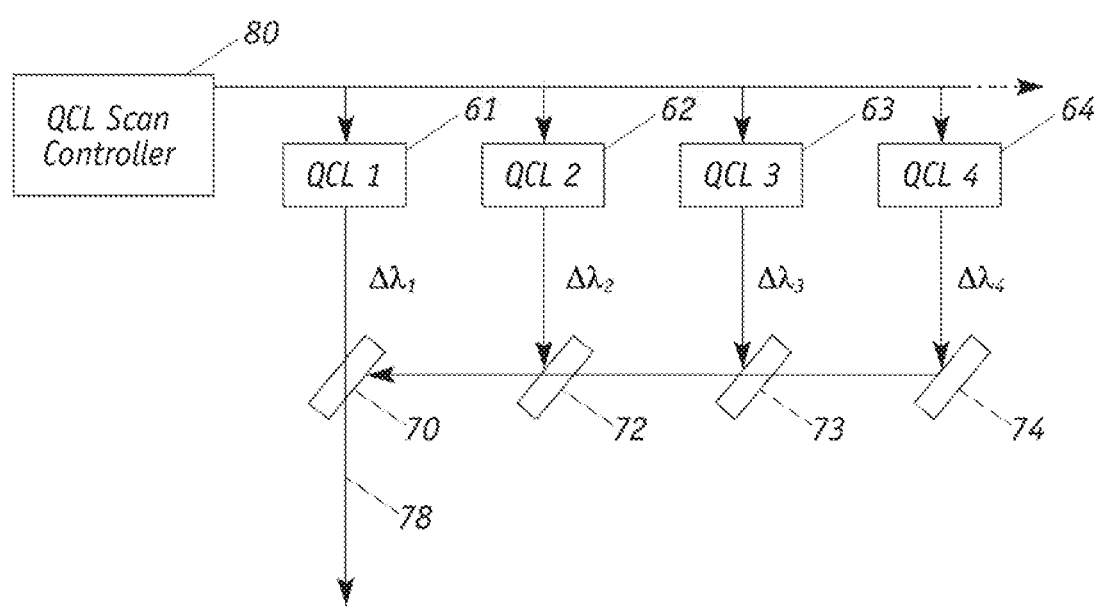
FIG. 4 depicts a broad wavelength range multiplexed QCL light source.

FIG. 4 is a diagram of a broad wavelength range multiplexed QCL light source. The output of each QCL source, QCL 1 (61) with wavelength range $\Delta\lambda_1$, QCL2 (62) with wavelength range $\Delta\lambda_2$, QCL 3 (63) with wavelength range $\Delta\lambda_3$, QCL4 (64) with wavelength range $\Delta\lambda_4$, etc, is aligned and directed by reflective elements 70, 72, 73, and 74, respectively, to produce a single broad wavelength range tunable laser light source. Elements 70, 72, 73, and 74 can be dichroic beam splitters that provide output 78. Preferably, the expected intensity of each QCL is known and corrections made. Since a single QLC is activated at a time, a switch can be employed to synchronize their activations. Alternatively, shutter mechanisms positioned before each QLC can be employed. The QCL scan controller 80 scans each QCL within its wavelength range and switches between QCLs to provide a QCL light source that is tunable over the broad wavelength range covered by the set of QCLs that are multiplexed. Although only 4 QCLs are shown, it is understood that a multiplexed array of other than 4 QCLs can be used to span a desired wavelength range.

Figure 5:
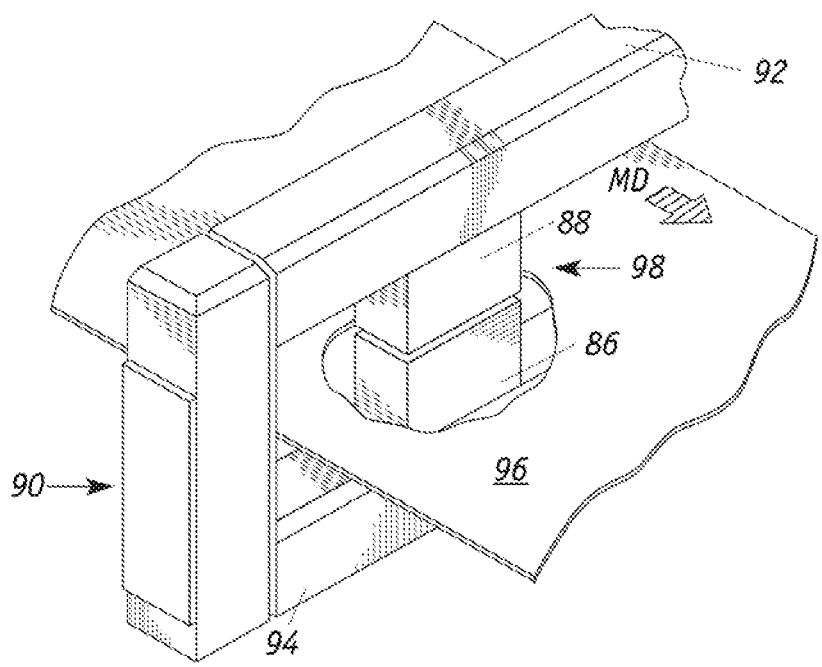
FIG. 5 shows a sheet making system implementing a caliper sensor in a dual head scanner.

FIG. 5 illustrates a scanning sensor system 90 whereby a caliper sensor is incorporated into a dual head scanner 98 that measures the caliper of sheet 96 during continuous production. Scanner 98 is supported by two transverse beams 92, 94 on which are mounted upper and lower scanning heads 88, 86. The operative faces of scanner heads define a measurement gap that accommodates sheet 96. In one particular implementation of the caliper sensor operating in the reflective mode, both the QCL and detector of the sensor are incorporated into scanner head 88, which moves repeatedly back and forth in the cross direction across the width of sheet 96, which moves in the machine direction (MD), so that the thickness of the entire sheet may be measured. For example, when the sensor is operating in the reflective mode as illustrated in FIG. 2, both the radiation source and receiver can be housed within upper scanner head 88. Alternatively, when the caliper sensor is operating in the transmissive mode as shown in FIG. 3, the QLC is positioned in scanner head 88 and the detector is positioned in scanner head 86.

The movement of the dual scanner heads 86, 88 is synchronized with respect to speed and direction so that they are aligned with each other. The radiation source produces an illumination (spot) on the sheet 96 as the sensor moves repeatedly back and forth in the CD across the width of the moving sheet 96, so that the thickness of the entire sheet can be monitored. The caliper sensor of the present invention directs a beam of radiation at the same spot on a sheet while varying the wavelength. In this regard, the time scale over which the wavelength is varied needs to be fast enough so that the length viewed by the sensor (while a scanner head is moving) in the cross-direction direction and machine direction is minimized.

Figure 6:
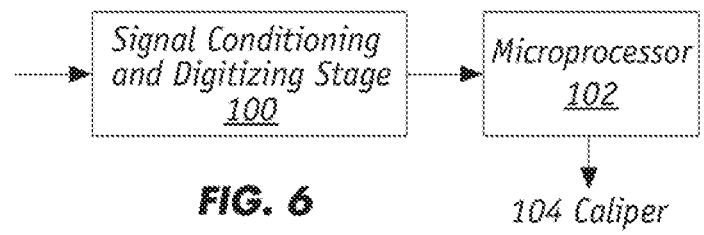
FIG. 6 is a diagram of a system employing process measurements to calculate the caliper of the web.

FIG. 6 depicts a process for controlling the manufacture of paper or other porous membranes or similar webs by continuously measuring the caliper of the web. Digitized signals representing the intensity of the measured radiation reflected from the web as the range of wavelengths is scanned is generated by the signal conditioning and digitizing stage 100 and is employed by microprocessor 102 to calculate caliper 104 signals which can control actuators upstream and/or downstream of the scanner system 90 (FIG. 5) to regulate production mechanisms in response to the caliper measurements.

Figure 7:
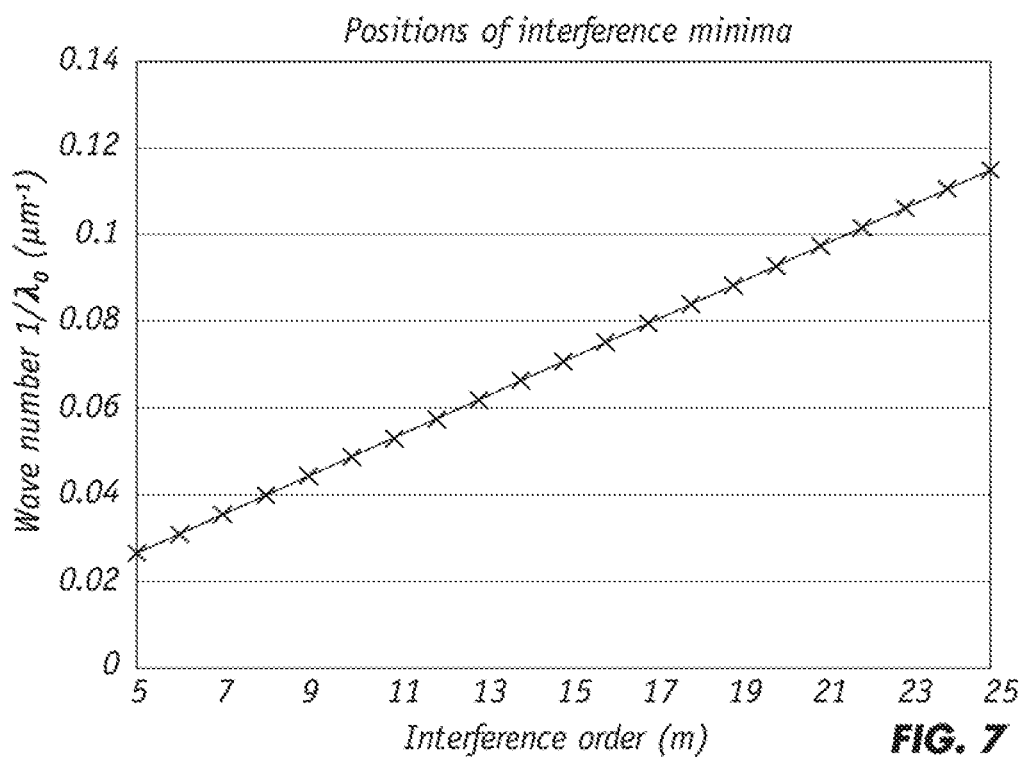
FIG. 7 is a graph of wave number at intensity minima vs. fringe order illustrating fringe interference signal, showing the positions of interference minima, for an 80 microns thick product at angle of incidence θ=30°, and with the web index of refraction assumed to be 1.5.

A particular feature of mid infrared radiation is that the longer wavelengths compared to visible or near infrared make it less sensitive to scatter by the web surface irregularities or roughness. Furthermore, mid infrared wavelengths are of the same order of magnitude as the thickness of typical web products such as paper and plastic films. The combination of the two results in interference fringes with high enough visibility that they can be measured and analyzed. A radiation transmission window through water exists at around a wavelength, $\lambda_0$ of approximately 22 microns. That is, the total amount of transmitted radiation detected at this wavelength is least sensitive to water. Thus, radiation at this wavelength is particularly suited for in measuring the thickness of paper, especially paper having a thickness typically in the range of 10 microns to 200 microns. FIG. 7 illustrates the expected wave number at intensity minima with the interference fringe that is formed using the caliper sensor of the present invention. The calculated values assume that the web is 80 microns thick and has an index of refraction of 1.5 using radiation at 30° incident angle with respect to the web normal direction.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A non-contact method of measuring the thickness of a moving film, which has a first side and a second side, that comprises:
   a. supporting the moving film wherein the film has an outer surface on the first side and an inner surface on the second side;
   b. directing a laser beam from a tunable quantum cascade laser at a selected set angle of incidence onto a single spot on the outer surface on the first side, wherein the laser beam is tuned across a mid-infrared range of wavelengths that is between 8-25 microns;
   c. scanning the laser beam wavelength through a selected range that is within the mid-infrared range;
   d. measuring the intensity of an interference pattern with a detector wherein the interference pattern forms from superposition of radiation that is transmitted directly through the film and radiation that is transmitted through the second side after internal reflections within the film;
   e. generating, synchronized wavelength signals, using a wavelength scan controller, that are communicated to the laser and a computer,
   f. correlating with the computer the measurement signals from the detector with the wavelength of the laser beam as the laser beam wavelengths are scanned through the selected mid-infrared range; and
   g. calculating the thickness of the film by analyzing the interference pattern of the film by utilizing the relationship among the laser beam incident angle ($\Theta_1$), wavelength ($\lambda_0$), index of refraction of the film ($n_2$), and film thickness (d) wherein said relationship is expressed as $$n_1^2 \sin^2 \theta_1 = n_2^2 - \left(\frac{m\lambda_0}{2d}\right)^2,$$

wherein m is the interference order and is an integer, m=0, 1, 2, . . . and ($n_1$) is the index of refraction of air.

2. The method of claim 1 wherein step (d) comprises measuring the occurrence of interference maxima.

3. The method of claim 1 wherein the film comprises paper or plastic.

4. The method of claim 1 wherein the film comprises plastic made of polyethylene, polypropylene, polyethylene terephthalate, polytetrafluoroethylene or polyvinyl chloride.

5. The method of claim 1 wherein step (b) employs focusing elements that direct the laser beam onto the single spot on the film as the laser beam is scanned through the selected wavelength range.

6. The method of claim 1 wherein step (b) employs a beam steering mirror system.

7. The method of claim 1 wherein step (c) includes the wavelength scan controller selecting the wavelengths emitted by the laser.

8. The method of claim 1 wherein step (d) employs optics that directs intensity variations of a laser-illuminated spot onto the detector.

9. A system for thickness measurements of a moving sheet of material having a first side and a second side that comprises:
   (a) a first scanning head disposed adjacent to the first side of the moving sheet wherein the first scanning head has a first operative face and an infrared radiation source comprising at least one tunable quantum cascade laser that is configured to direct a laser beam of radiation that has a wavelength that is scanned through a selected range between 8-25 microns;
   (b) a second scanning head disposed adjacent the second side of the moving sheet wherein the second scanning head has a second operative face, wherein the first operative face and the second operative face define a measurement gap though which the moving sheet travels without contacting the first or second operative faces;
   (c) a detector positioned in the second scanning head, the detector is configured to detect the intensity of an interference pattern that forms from superposition of radiation that is transmitted directly through the moving sheet and radiation that is transmitted through the second side of the moving sheet after internal reflections within the moving sheet;
   (d) a computer that is configured to correlate measurement signals from the detector with the mid-infrared range of wavelengths generated by the tunable quantum cascade laser beam as the laser beam wavelengths are scanned through the selected mid-infrared range;
   (e) a wavelength scan controller configured to generate synchronized wavelength signals that are communicated to the tunable quantum cascade laser and; and
   (f) a microprocessor that is configured to the interference pattern and that is configured to calculate the thickness of the sheet wherein the thickness of the sheet (d) is related to laser beam incident angle ($\theta_1$), wavelength ($\lambda_0$), and index of refraction of the sheet ($n_2$), by a relationship which is expressed as $$n_1^2 \sin^2 \theta_1 = n_2^2 - \left(\frac{m\lambda_0}{2d}\right)^2,$$

wherein m is the interference order and is an integer, m=0, 1, 2, . . . and ($n_1$) is the index of refraction of air.

10. The system of claim 9 wherein the beam of radiation reaches a fixed position on an outer surface of the first side of the moving sheet at a set angle of incidence of from 0 to 60 degrees with respect to the sheet surface normal.

11. The system of claim 9 wherein the tunable quantum cascade laser is configured to be sequentially tuned to emit at selectable wavelengths substantially transmitted by the sheet.

12. The system of claim 9 wherein the at least one tunable quantum cascade laser includes a plurality of quantum cascade lasers, wherein each of the quantum cascade lasers emits infrared radiation in a different narrow wavelength range that is multiplexed together through a system of mirrors and dichroic beam splitters to create a laser source that can be scanned over a broad wavelength range.

13. The system of claim 9 wherein the sheet comprises paper or plastic that made of polyethylene, polypropylene, polyethylene terephthalate, polytetrafluoroethylene or polyvinyl chloride.

14. The system of claim 9 wherein selected range is sufficient to produce at least 2 interference maxima in the interference pattern.

15. The system of claim 9 wherein the first and second scanning heads are configured to scan in a cross direction to the moving sheet.

16. The system of claim 9 wherein the microprocessor is configured to generate thickness measurement signals that control actuators to regulate production of the sheet.

* * * * *